US006923911B1

(12) United States Patent
Beier et al.

(10) Patent No.: US 6,923,911 B1
(45) Date of Patent: Aug. 2, 2005

(54) METHOD OF FILTERING AIR THROUGH AN AIR PASSAGEWAY

(76) Inventors: Scott B. Beier, 915 N. 43rd Ave., Omaha, NE (US) 68131; Rex A. Adams, 915 N. 43rd Ave., Omaha, NE (US) 68131

( * ) Notice: Subject to any disclaimer, the term of this patent is extended or adjusted under 35 U.S.C. 154(b) by 212 days.

(21) Appl. No.: 10/445,546

(22) Filed: May 27, 2003

Related U.S. Application Data

(60) Continuation-in-part of application No. 10/139,990, filed on May 6, 2002, now abandoned, which is a division of application No. 09/476,555, filed on Jan. 3, 2000, now Pat. No. 6,409,805, which is a continuation-in-part of application No. 08/146,901, filed on Oct. 20, 1993, now Pat. No. 6,071,419.

(51) Int. Cl.[7] ............................................. B01D 46/00
(52) U.S. Cl. ............................ 210/273; 55/307; 55/482
(58) Field of Search ............................... 55/307, 309.1, 55/482, 487, 489, 495; 95/273; 210/323.1, 210/335, 767

(56) References Cited

U.S. PATENT DOCUMENTS

| | | | | |
|---|---|---|---|---|
| 1,743,675 A | * | 1/1930 | Anders ........................ 55/443 |
| 2,582,777 A | * | 1/1952 | Grozinger .................. 264/154 |
| 3,026,968 A | * | 3/1962 | Koskinen ..................... 55/525 |
| 3,050,193 A | * | 8/1962 | Gillick, Jr. et al. ...... 210/494.1 |
| 3,217,471 A | * | 11/1965 | Leslie ......................... 96/134 |
| 3,253,072 A | * | 5/1966 | Scragg et al. ............... 264/147 |
| 3,290,870 A | * | 12/1966 | Jensen ........................ 55/486 |
| 3,336,734 A | * | 8/1967 | Schultz ........................ 96/361 |
| 3,568,416 A | * | 3/1971 | Staunton ..................... 96/133 |
| 3,577,710 A | * | 5/1971 | Feldman ..................... 96/140 |
| 3,592,769 A | * | 7/1971 | Decker ....................... 210/491 |
| 3,744,222 A | * | 7/1973 | Delao .......................... 55/446 |
| 3,912,634 A | * | 10/1975 | Howell ....................... 210/222 |
| 4,019,987 A | * | 4/1977 | Krasnow .................... 210/232 |
| 4,105,724 A | * | 8/1978 | Talbot ...................... 261/112.1 |
| 4,159,672 A | * | 7/1979 | Garguilo et al. ............ 454/337 |
| 4,321,064 A | * | 3/1982 | Vargo .......................... 95/272 |
| 4,443,233 A | | 4/1984 | Moran .......................... 55/97 |

(Continued)

Primary Examiner—John Kim
(74) Attorney, Agent, or Firm—Thomte, Mazour & Niebergall; Dennis L. Thomte

(57) ABSTRACT

The filter system for filtering particulate material from a generally unidirectional fluid stream comprising a first filter removably positioned in the fluid stream and a second filter removably positioned in the fluid stream downstream of the first filter. The first filter comprises a pre-filter and includes a layer of fluid-permeable material having a plurality of spaced-apart openings extending completely therethrough. The method of utilizing the fluid filter system of this invention is also disclosed and comprises the steps of: (1) removably positioning a first filter in the fluid stream; and (2) removably positioning a fluid-permeable second filter in the fluid stream downstream of the first filter. The first filter may be removed from the fluid when it becomes restrictive to air flow. The system may be operated so that the air may be passed through the second filter until the second filter becomes clogged or restrictive to air flow. The filters may be positioned in an air discharge passageway associated with a paint spray booth or may be positioned in an air intake passageway extending into a heating system, a ventilating system or an air conditioning system.

10 Claims, 7 Drawing Sheets

U.S. PATENT DOCUMENTS

| | | | |
|---|---|---|---|
| 4,466,816 A | 8/1984 | Felker | 55/267 |
| 4,555,342 A | 11/1985 | Grant | 210/488 |
| 4,579,658 A | 4/1986 | Moller | 210/483 |
| 4,627,406 A | 12/1986 | Namiki et al. | 123/573 |
| 4,878,974 A | 11/1989 | Kagawa | 156/85 |
| 4,904,288 A | 2/1990 | d'Augereau | 55/485 |
| 5,137,634 A | 8/1992 | Butler et al. | 210/490 |
| 5,221,230 A | 6/1993 | Darvin et al. | 454/53 |
| 5,437,701 A | 8/1995 | Townsley | 55/486 |
| 6,156,089 A | 12/2000 | Stemmer et al. | 55/467 |
| 6,409,805 B1 | 6/2002 | Beier et al. | 95/287 |
| 6,533,654 B2 | 3/2003 | DeRegge | 454/52 |

\* cited by examiner

METHOD OF FILTERING AIR THROUGH AN AIR PASSAGEWAY

CROSS-REFERENCE TO RELATED APPLICATION

This is a continuation-in-part application of Petitioners' earlier application Ser. No. 10/139,990 filed May 6, 2002 now abandoned, entitled "A FLUID FILTER SYSTEM" which is a divisional application of Petitioners' earlier application Ser. No. 09/476,555 filed Jan. 3, 2000 U.S. Pat. No. 6,409,805, entitled "A FLUID FILTER SYSTEM", which is a continuation-in-part application of Petitioners' earlier application Ser. No. 08/146,901 filed Oct. 20, 1993 U.S. Pat. No. 6,071,419, entitled FLUID FILTER.

BACKGROUND OF THE INVENTION

1. Field of the Invention

The present invention relates generally to disposable filters for fluid streams, and more particularly to a filter system employing one or more pre-filters and one or more final filters located downstream of the pre-filters. The filters of this invention may be used in association with a spray paint booth, a heating system, a ventilating system, an air handling system, or an air conditioning system.

2. Description of the Related Art

Many materials and combinations of materials have been used as filtration media to remove solid or liquid particulate from fluid streams. The capabilities of such filter media are judged according to three main criteria: (1) the particulate removal efficiency (i.e., the ability of the filter media to capture and retain particulate); (2) the pressure drop for a given flow rate of fluid through the media (which is utilized as a measure of the power required to move the fluid stream through the media); and (3) the holding capacity (i.e., the total amount of particulate which can be retained by the media before the pressure drop becomes so great that the media must be cleaned or replaced).

The filter disclosed in application Ser. No. 09/476,555 is designed to be placed in the fluid stream to trap the particulates suspended in a particulate-laden fluid stream. The cost of the filters disclosed in the co-pending application is not insignificant, so anything that can be done to extend the life thereof will result in a significant cost reduction in the filtering process. The filter system disclosed in Ser. No. 10/139,990 represents an improvement in the art and the instant invention is believed to represent a further improvement in the art.

SUMMARY OF THE INVENTION

A filter system for filtering particulate material from a generally unidirectional fluid stream is disclosed comprising a first filter removably positioned in the fluid stream and a second filter removably positioned in the fluid stream downstream of the first filter. The first filter is a pre-filter and comprises a layer of fluid-permeable material having an intake side and a discharge side with the layer having a plurality of spaced-apart openings extending completely therethrough. The first and second filters may be either placed adjacent one another in the fluid stream or spaced-apart in the fluid stream. Further, a plurality of first filters may be utilized. Additionally, a plurality of the second filters may be positioned in the fluid stream. The openings extending through the first filter are sufficiently large such that the openings tend not to plug due to the accumulation of filtered particulate. The use of the fluid permeable material in the first filter allows some particulate-laden fluid to pass through the material itself, while some particulate material is filtered by the permeable material in the first filter. The purpose of the first filter being located upstream of the second or normal filter is to reduce the amount of particulate material being presented to the second filter. The presence of the openings in the first filter reduces the amount of raw material required to cover a fluid flow area, therefore enabling the pre-filter to be made less expensively. The filter system of this invention may be used in the filter wall, filter pit or air discharge passageway extending from a paint spray booth or in the air intake passageway of a heating system, an air handling system, a ventilating system or an air conditioning system.

It is a principal object of the invention to provide an improved fluid filter system.

Still another object of the invention is to provide a method of filtering particulate material from a generally unidirectional fluid stream.

A further object of the invention is to provide a fluid filter system employing a pre-filter upstream of the normal filter.

Yet another object of the invention is to provide a fluid filter system which employs the use of relatively inexpensive pre-filtering material upstream of the normal filter to extend the life of the normal filter.

Still another object of the invention is to provide a fluid filter system employing a pre-filter which is comprised of a layer of fluid-permeable material having a plurality of spaced-apart openings extending completely therethrough with a reinforcing material being associated therewith to prevent the filter from collapsing or sagging.

Yet another object of the invention is to provide a fluid filter system which may be used in the filter wall, filter pit or air discharge passageway extending from a paint spray booth.

Still another object of the invention is to provide a fluid filter system which may be used in the air intake passageway of a heating system.

Still another object of the invention is to provide a fluid filter system which may be used in the air intake passageway of a ventilating system.

Still another object of the invention is to provide a fluid filter system which may be used in the air intake passageway of an air conditioning system.

Yet another object of the invention is to provide a fluid filter system which may be used in an air handling system.

These and other objects will be apparent to those skilled in the art.

DESCRIPTION OF THE PREFERRED EMBODIMENT

Figure 1:
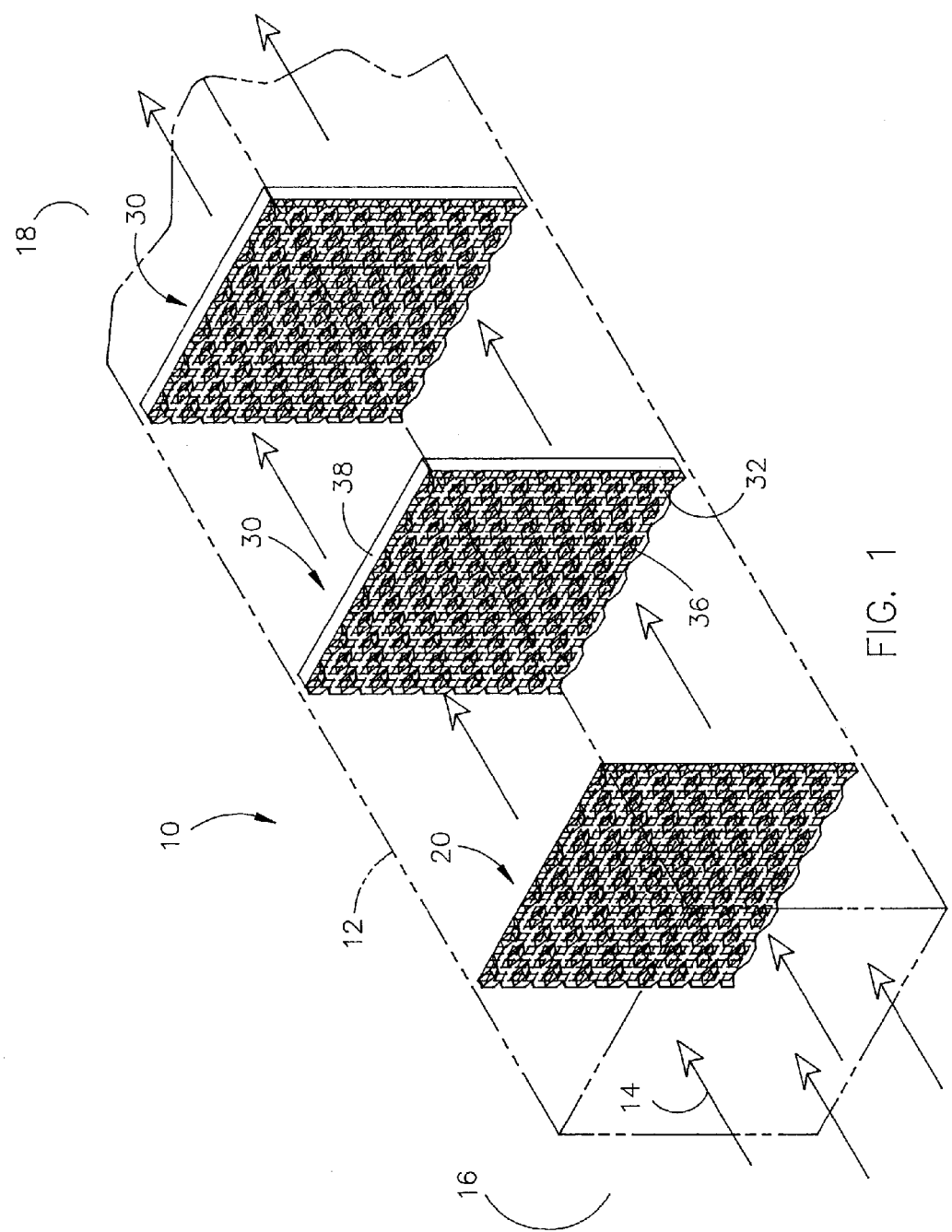
FIG. 1 is a perspective view illustrating an embodiment of the filter system of this invention.

In FIG. 1, the numeral 10 refers generally to an embodiment of the fluid filter system of this invention which is utilized in a conduit or passageway 12 through which is passing a particulate-laden fluid stream travelling in the direction indicated by the arrows 14. For purposes of description, the numeral 16 refers to the upstream end of the conduit 12 while the numeral 18 refers to the downstream side of the conduit. The numeral 20 refers to a first filter utilized in this invention which comprises a pre-filter.

Figure 2:
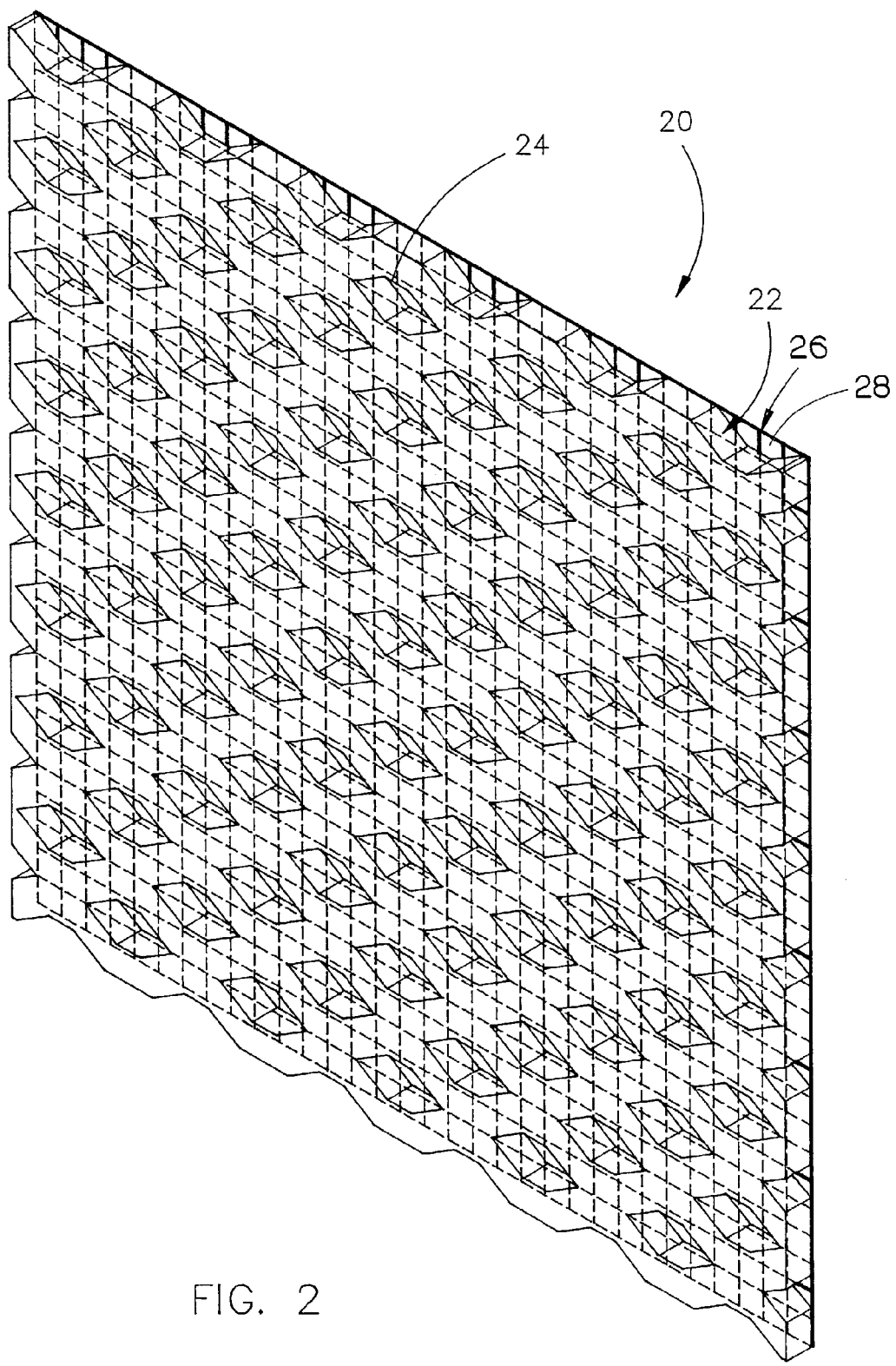
FIG. 2 is a partial perspective view of the pre-filter employed in the filter system of this invention.
Figure 4:
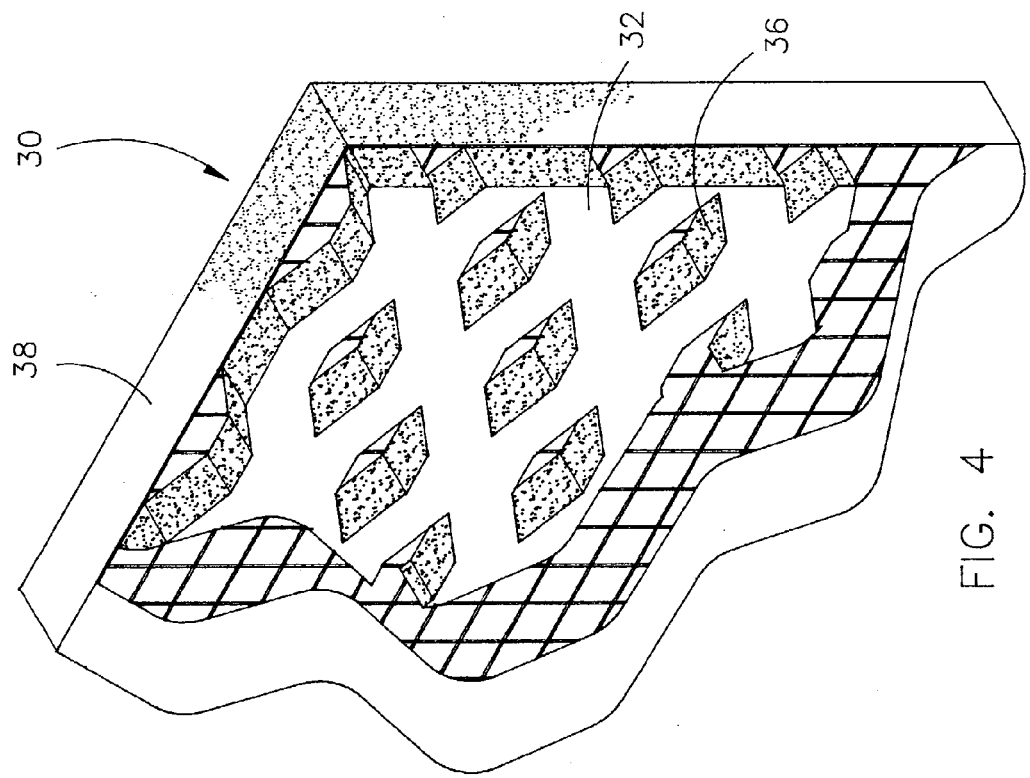
FIG. 4 is a partial perspective view of the downstream filter of this invention with portions thereof cut away to more fully illustrate the invention.
Figure 3:
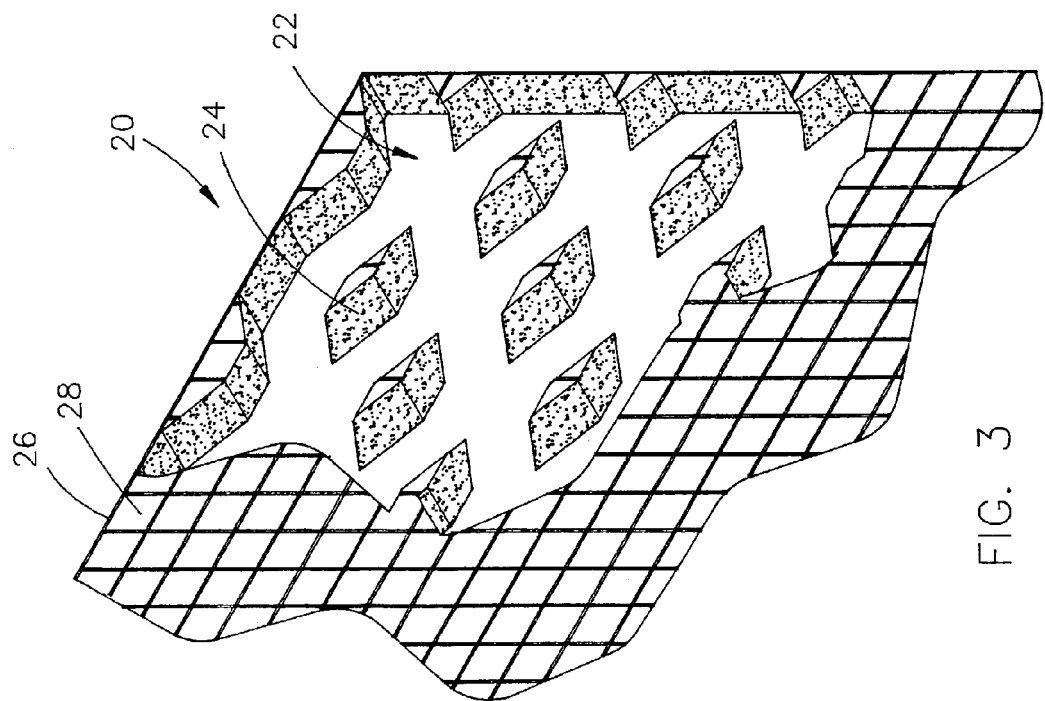
FIG. 3 is a partial perspective view of the pre-filter with portions thereof cut away to more fully illustrate the invention.

As seen in FIG. 2, filter 20 comprises a layer of fluid-permeable material 22 having a plurality of uniformly spaced openings 24 formed therein which extend completely through the material. Although it is preferred that the openings 24 be uniformly spaced, the openings 24 could be irregularly spaced and irregularly sized, if desired. It is preferred that a reinforcing material 26 be attached to or integrated within the layer 22 to prevent the filter from collapsing or sagging when positioned in the fluid stream. Preferably, layer 22 is comprised of a stabilized, high loft, non-woven batting material. Reinforcing material 26 may be formed of a string-like net material or a plastic net material having openings 28.

Figure 5:
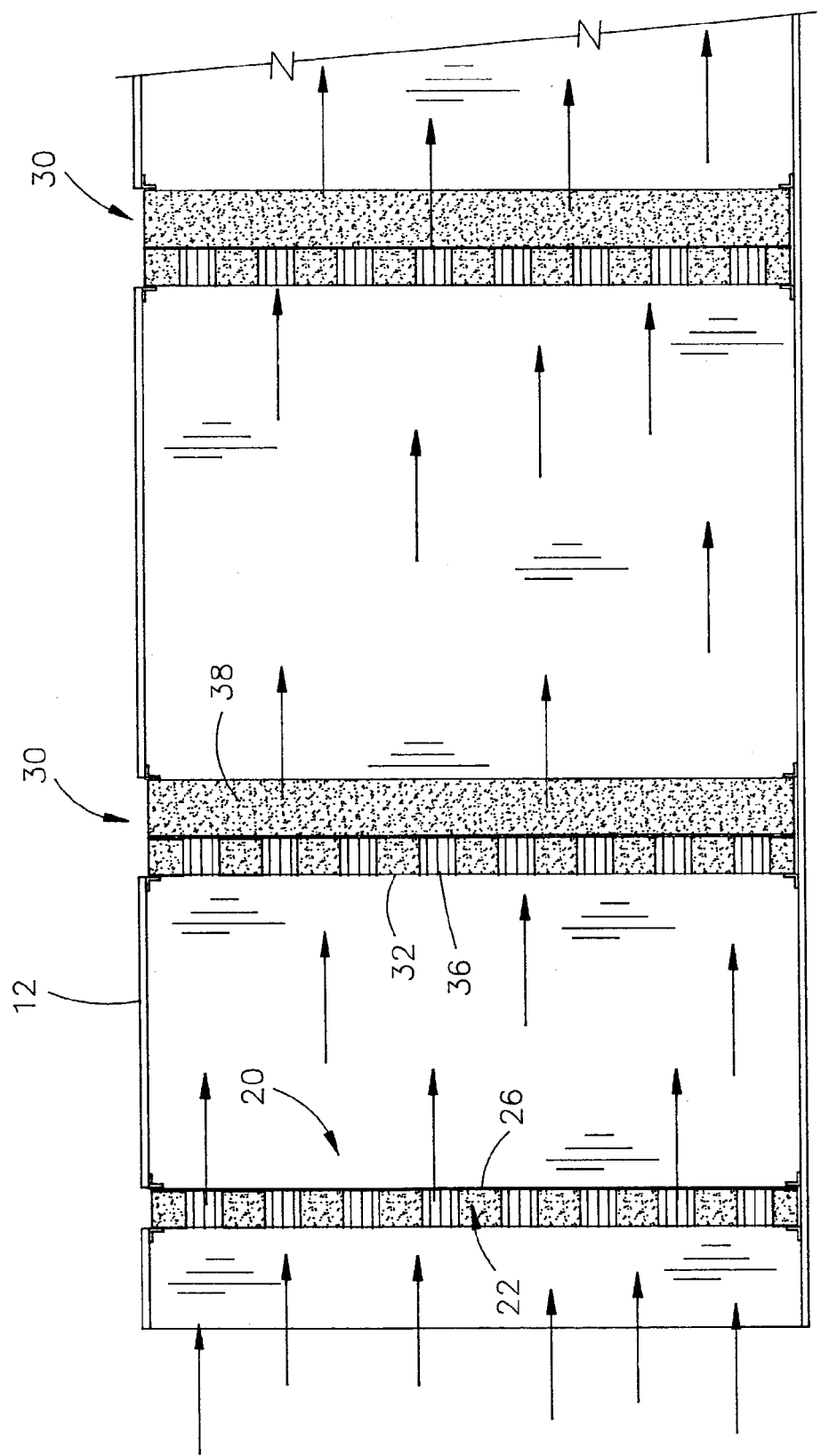
FIG. 5 is a side view illustrating an embodiment of the fluid filter system of this invention.

The pre-filter 20 is removably positioned in the conduit 12 in any convenient fashion to facilitate the ease of replacement thereof. Although FIG. 1 illustrates that only a single filter 20 is utilized in the filter system, any number of the pre-filters 20 may be utilized. At least one regular or final filter 30 is removably positioned in the conduit 12 in conventional fashion, with the fluid filter or final filters 30 being positioned downstream of the pre-filter 20. As seen in FIGS. 1 and 5, a plurality of the final filters 30 are utilized. Filters 30 may take any form, but it is preferred that they be constructed in the manner illustrated in U.S. Pat. No. 6,409,805, wherein a first layer of fluid permeable material 32 is utilized which has a plurality of openings 36 formed therein and wherein a second layer of fluid permeable material 38, without openings, is positioned downstream of the layer 32. The filter 30 is preferably constructed of the same material as that of the filter 20.

The system disclosed herein essentially relates to an improved "disposable" pre-filtering material that utilizes a layer of fluid-permeable material having many large openings 24 extending completely through the layer 22. The filter 20 is placed upstream of any existing filter such that the pre-filtering material is exposed to the particulate-laden fluid stream before the normal filter is exposed to the fluid stream. The pre-filter 20 may be either placed against the upstream surface of the existing filter or separated by a space therefrom. The openings 24 in filter 20 are sufficiently large such that the openings 20 tend not to plug due to the accumulation of filtered particulate. Inasmuch as the openings 24 are sufficiently large to minimize plugging, the filter 20 does not completely restrict the flow of fluid through the media even when the media is heavily laden with particulate. The use of the fluid-permeable material in the filter 20 allows some particulate-laden fluid to pass through the material itself. During this passage through the permeable material, some particulate is filtered from the fluid resulting in the amount of particulate present in the fluid stream downstream of the pre-filter 20 being significantly less than the amount present upstream, but without the risk of the pre-filter 20 becoming completely plugged.

Furthermore, the presence of the openings 24 in the filter 20 reduces the amount of raw material required to cover a fluid flow area. Since less material is required, the pre-filter 20 can be made very inexpensively.

Although the drawings illustrate that pre-filter 20 has the same dimensions as the filter or filters 30, pre-filter 20 could have a dimension less than the filter or filters 30 such that it would not extend completely across the flow area.

Figure 6:
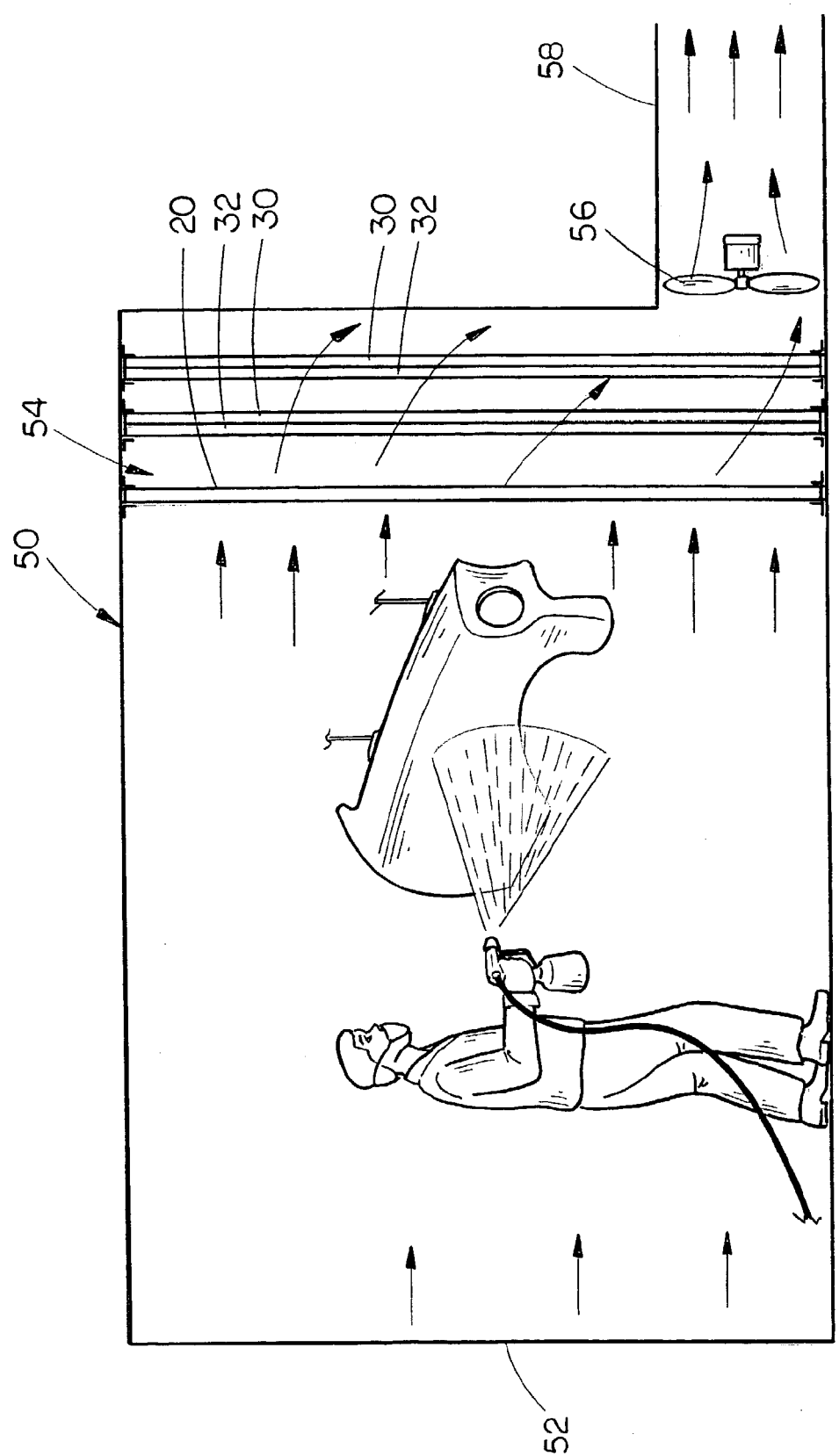
FIG. 6 is a side view illustrating filters of this invention being used in a spray paint booth environment.

In FIG. 6, the numeral 50 refers generally to a spray paint booth wherein air enters the booth at 52 and is discharged through the filter wall generally indicated at 54. In some installations, the air is discharged through a filter pit. In either situation, the air is forced outwardly through conduit 58 by means of exhaust fan 56. Filter wall 54 includes a pre-filter 20 positioned on the intake side of the filter wall 54. One or more of the filters 30 are positioned downstream of the filter 20 in the filter wall 54. The filters 20 and 30 are removably positioned in the filter wall 54 to facilitate ease of replacement thereof. Although FIG. 6 illustrates that only a single filter 20 is utilized in the filter system, any number of the pre-filters 20 may be utilized. At least one regular or final filter 30 is removably positioned in the filter wall 54. Filters 30 may take any form, as discussed above, but it is preferred that they be constructed in the manner illustrated in the co-pending application wherein a first layer of fluid permeable material 30 is utilized which has a plurality of openings corresponding to openings 36 formed therein and wherein a second layer of fluid permeable material, without openings, is positioned downstream of the layer 32. The filter 30 is preferably constructed of the same material as that of the filter 20. When the pre-filter 20 becomes restrictive to air flow, it may be removed or replaced. If the pre-filter 20 is removed, the final filter 30 will function for an extended period of time before it is necessary to replace both the pre-filter 20 and the final filter 30.

Figure 7:
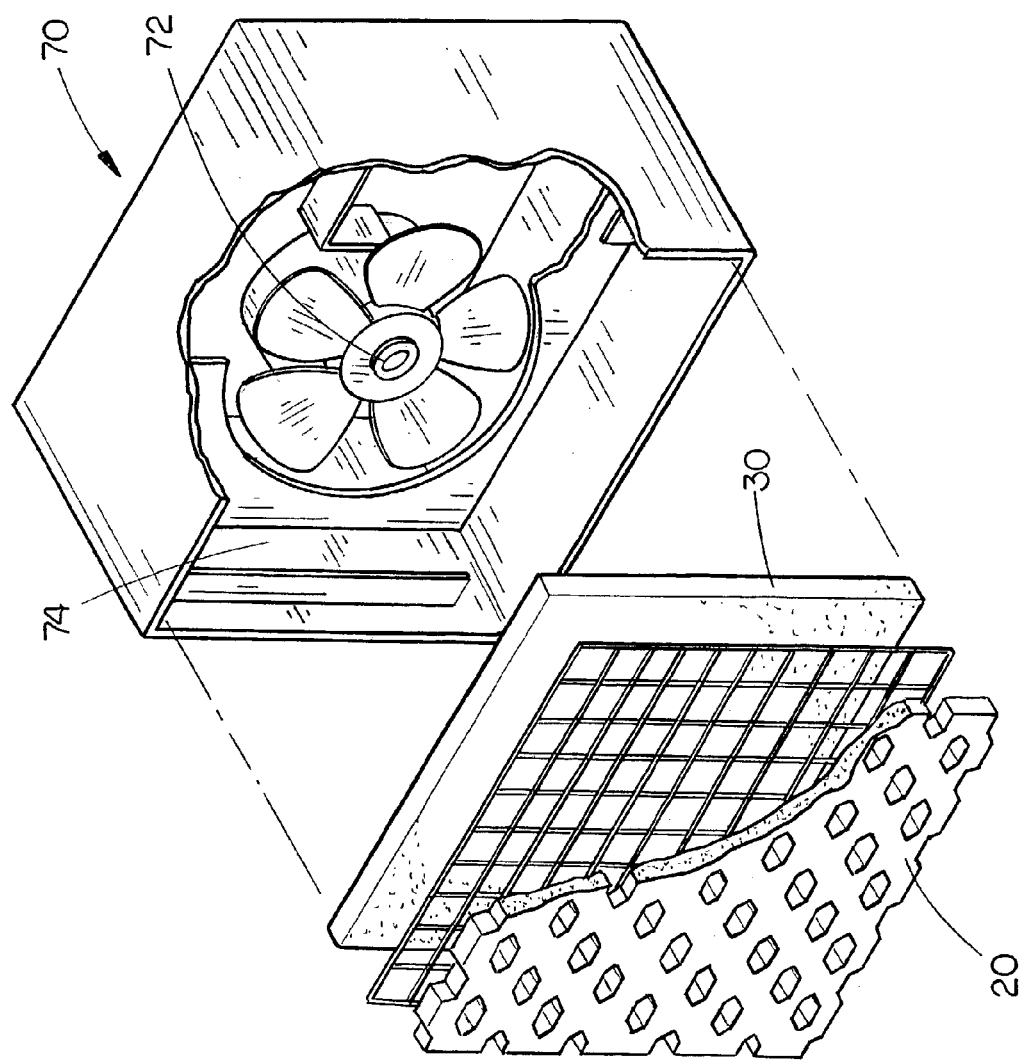
FIG. 7 is a perspective view illustrating the filters of this invention being used in an air handling system.

In FIG. 7, a conventional air handling system is referred to generally by the reference numeral 70 and includes a motorized fan 72 which draws air through the passageway or conduit 74. A pre-filter 20 and a final filter 30 are installed in the intake of the air handling system 70. As described above, one or more of the pre-filters 20 and one or more of the final filters 30 may be utilized. When the pre-filter 20 becomes restrictive to air flow, it may be removed or replaced. If the pre-filter 20 is removed, the final filter 30 will function for an extended period of time before it is necessary to replace both the pre-filter 20 and the final filter 30.

Figure 8:
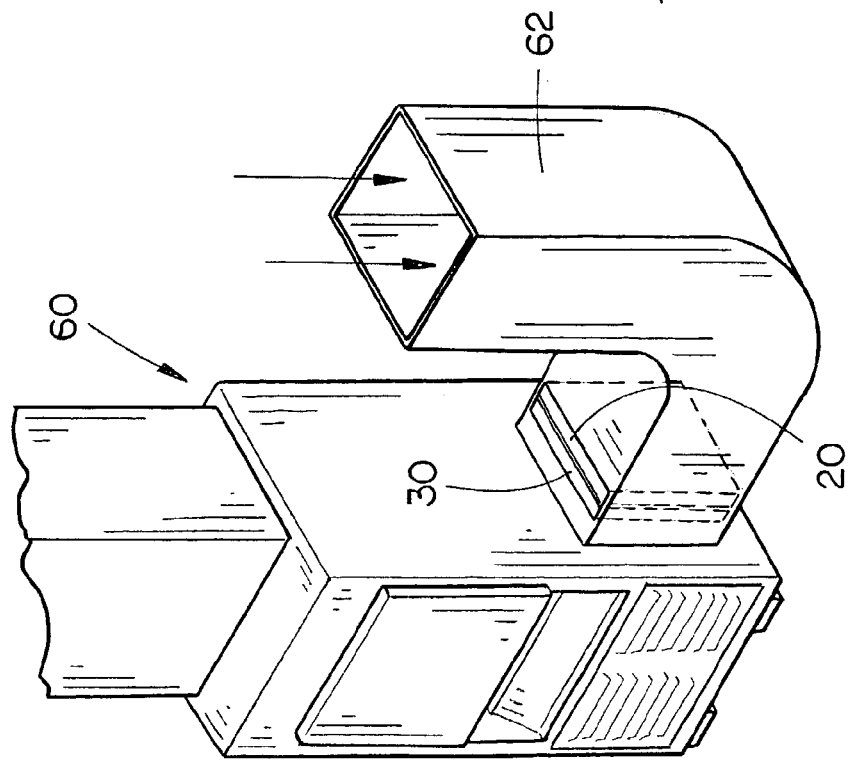
FIG. 8 is a perspective view illustrating the filters of this invention being used in association with a furnace.

FIG. 8 illustrates a conventional furnace or heating system which is referred to generally by the reference numeral 60. System 60 has an intake or cold air return passageway or conduit 62. A pre-filter 20 and a final filter 30 are removably positioned in the conduit 62. When the pre-filter 20 becomes restrictive to air flow, it may be removed or replaced. If the pre-filter 20 is removed, the final filter 30 will function for an extended period of time before it is necessary to replace both the pre-filter 20 and the final filter 30.

Figure 9:
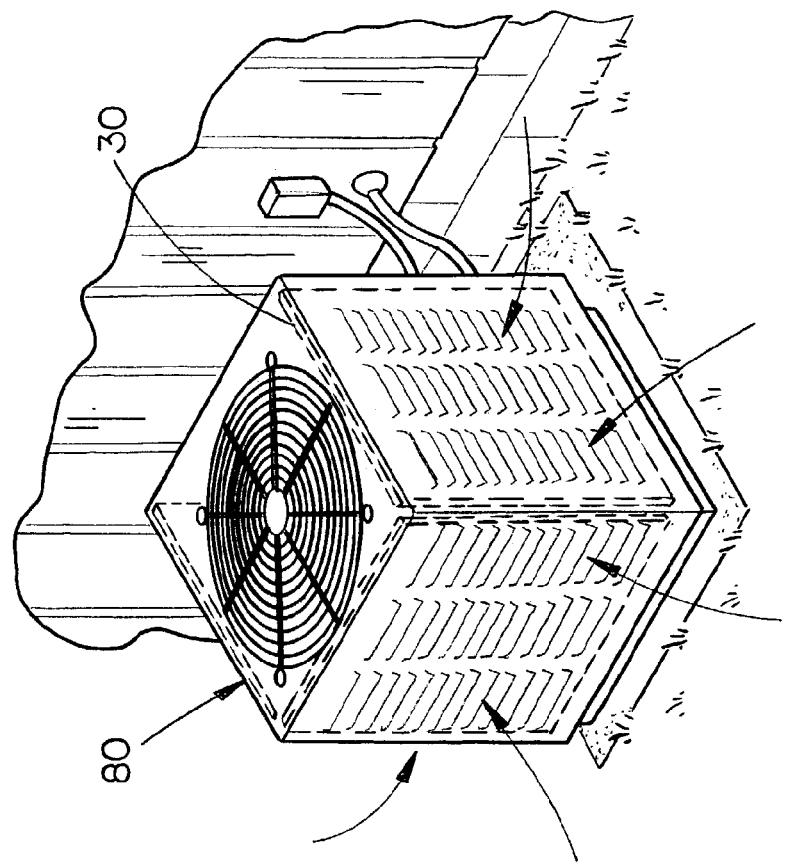
FIG. 9 is a perspective view illustrating the filter system of this invention being used with an air conditioning system.

FIG. 9 illustrates a conventional air conditioning system which is referred to generally by the reference numeral 80. The air conditioning system 80 has air intake openings at its sides, as illustrated by the arrows in FIG. 9, so that air is drawn into the interior thereof. One or more pre-filters 20 and one or more final filters 30 are removably positioned in the air conditioning system so as to filter the incoming air for the air conditioning system in the same manner as described hereinabove. When the pre-filter 20 becomes restrictive to air flow, it may be removed or replaced. If the pre-filter 20 is removed, the final filter 30 will function for an extended period of time before it is necessary to replace both the pre-filter 20 and the final filter 30.

Thus it can be seen that the fluid filter system of this invention, as well as the method of using the same, accomplish at least all of their stated objectives.

We claim:

1. The method of filtering air passing through an air discharge passageway, comprising the steps of:
   removably positioning a pre-filter in the air discharge passageway;
   removably positioning a second filter in the air discharge passageway downstream of said pre-filter;
   removing said pre-filter from said air discharge passageway upon said pre-filter becoming clogged with material in the air passing therethrough; and
   passing air through said second filter.

2. The method of claim 1 wherein said pre-filter comprises a layer of fluid-permeable material having an intake side and a discharge side and wherein said layer has a plurality of spaced-apart openings extending completely therethrough.

3. The method of claim 2 wherein said air discharge passageway is associated with a paint spray booth.

4. The method of filtering air passing through an air intake passageway, comprising the steps of:
   removably positioning a pre-filter in the air intake passageway;
   removably positioning a second filter in the air intake passageway downstream of said pre-filter;
   removing said pre-filter from said air intake passageway upon said pre-filter becoming clogged with material in the air passing therethrough; and
   passing air through said second filter.

5. The method of claim 4 wherein said pre-filter comprises a layer of fluid-permeable material having an intake side and a discharge side and wherein said layer has a plurality of spaced-apart openings extending completely therethrough.

6. The method of claim 4 wherein said air passageway extends into a heating system.

7. The method of claim 4 wherein said air passageway extends into a ventilating system.

8. The method of claim 4 wherein said air passageway extends into a air conditioning system.

9. The method of claim 1 wherein said pre-filter and said second filter are replaced upon said second filter becoming clogged with material in the air passing therethrough.

10. The method of claim 4 wherein said pre-filter and said second filter are replaced upon said second filter becoming clogged with material in the air passing therethrough.

* * * * *